United States Patent
Andreetto

(10) Patent No.: US 10,065,659 B2
(45) Date of Patent: Sep. 4, 2018

(54) BELT-CONVEYING AERIAL SYSTEM

(71) Applicant: Leitner S.p.A., Vipiteno (IT)

(72) Inventor: Alessandro Andreetto, Bressanone (IT)

(73) Assignee: Leitner S.P.A., Vipiteno (IT)

(*) Notice: Subject to any disclaimer, the term of this patent is extended or adjusted under 35 U.S.C. 154(b) by 228 days.

(21) Appl. No.: 15/113,676

(22) PCT Filed: Jan. 30, 2015

(86) PCT No.: PCT/IB2015/050724
§ 371 (c)(1),
(2) Date: Jul. 22, 2016

(87) PCT Pub. No.: WO2015/114583
PCT Pub. Date: Aug. 6, 2015

(65) Prior Publication Data
US 2017/0008536 A1 Jan. 12, 2017

(30) Foreign Application Priority Data
Jan. 31, 2014 (IT) .............................. TO2014A0073

(51) Int. Cl.
*B61B 7/06* (2006.01)
*B61B 7/00* (2006.01)
(Continued)

(52) U.S. Cl.
CPC .................. *B61B 7/06* (2013.01); *B61B 7/00* (2013.01); *B61B 12/002* (2013.01); *B65G 21/04* (2013.01)

(58) Field of Classification Search
CPC ........... B61B 12/002; B61B 7/00; B61B 7/06; B61B 12/00; B61B 12/02; B61B 12/122;
(Continued)

(56) References Cited

U.S. PATENT DOCUMENTS 609,687 A * 8/1898 Margesin ................ B61B 12/02
104/112
4,163,480 A * 8/1979 Highland .................. H02G 1/02
104/112
(Continued)

FOREIGN PATENT DOCUMENTS

EP 1 958 896 A2 8/2008
EP 2 460 744 A1 6/2012
(Continued)

OTHER PUBLICATIONS

Notification of the Recording of a Change Form PCT/IB/306 for International Application No. PCT/IB2015/050724, dated Jun. 2015.
(Continued)

*Primary Examiner* — Mark T Le
(74) *Attorney, Agent, or Firm* — Neal, Gerber & Eisenberg LLP

(57) ABSTRACT

A belt-conveying aerial system comprising: a pair of top fixed load-bearing ropes, which are parallel to one another and are set at a distance apart from one another in a transverse direction; a pair of bottom fixed load-bearing ropes; and a belt conveyor comprising a plurality of modules, which are aligned along the load-bearing ropes, are fixedly connected to the load-bearing ropes, and guide a belt for conveying materials; the modules being connected to the load-bearing ropes via an installation vehicle having a supporting top carriage mobile on the top load-bearing ropes, a pair of resting platforms suspended from the top carriage, and, for each bottom load-bearing rope, at least one pair of wheels, which are rotatable in contact with the respective bottom load-bearing rope and are set upstream and downstream of the corresponding module.

14 Claims, 3 Drawing Sheets

(51) Int. Cl.
*B65G 21/04* (2006.01)
*B61B 12/00* (2006.01)

(58) Field of Classification Search
CPC ........... B61B 3/02; B61B 5/02; B61B 12/005;
B61B 7/02; B65G 17/02; B65G 21/04;
B65G 15/00
USPC .................................................. 104/112, 115
See application file for complete search history.

(56) References Cited

U.S. PATENT DOCUMENTS

| | | | |
|---|---|---|---|
| 7,562,767 B2* | 7/2009 | Trieb ..................... | B65G 21/04 198/817 |
| 2013/0032452 A1* | 2/2013 | Trieb ....................... | B61B 7/06 198/838 |
| 2015/0303663 A1* | 10/2015 | Wall ........................ | H02G 1/02 182/36 |

FOREIGN PATENT DOCUMENTS

| EP | 2 460 745 A1 | 6/2012 |
|---|---|---|
| EP | 2 554 451 A1 | 2/2013 |

OTHER PUBLICATIONS

Notification Concerning Submission, Obtention or Transmittal of Priority Document for International Application No. PCT/IB2015/050724 dated Jun. 8, 2015.
International Search Report and Written Opinion for International Application No. PCT/IB2015/050724 dated Jun. 10, 2015.

* cited by examiner

BELT-CONVEYING AERIAL SYSTEM

PRIORITY CLAIM

This application is a national stage application of PCT/IB2015/050724, filed on Jan. 30, 2015, which claims the benefit of and priority to Italian Patent Application No. TO2014A000073, filed on Jan. 31 2014, the entire contents of which are each incorporated by reference herein.

BACKGROUND

Certain known belt conveyors of a modular type are formed by a succession of modules aligned with respect to one another along the ropes and stably connected together via the ropes themselves.

Each module comprises a rigid supporting frame of its own, which in turn comprises, for each top load-bearing rope, a row of top jaws for attachment to the top load-bearing rope itself and, for each of the bottom load-bearing ropes, a row of bottom jaws for attachment to the bottom load-bearing rope itself.

The frame supports a plurality of top idle rotating rollers configured to rest and guide, a concave forward or loading branch of a motor-driven conveyor belt, and a plurality of bottom rollers configured to support and guide a return branch of the conveyor belt itself.

The belt conveyor is progressively formed by installing in succession the various modules between the load-bearing ropes. In order to install the modules, an installation vehicle is provided, which comprises a carriage that is motor-driven or pulled by service ropes and is coupled to the top load-bearing ropes in order to displace in opposite directions along the load-bearing ropes themselves.

The carriage carries suspended therefrom a pair of supporting platforms for the staff responsible for installing, which are set on opposite lateral sides of the module that is being installed and of the load-bearing ropes and is provided with a device for attachment of the module during connection to the load-bearing ropes.

Even though known installation vehicles of the type described above are used, they render the operations of clinching of the jaws to the load-bearing ropes frequently problematical. Specifically, during lifting and positioning of each module, the top load-bearing ropes inevitably yield increasing their deflection and thus approaching the bottom load-bearing ropes Consequently, the effective distance between each top load-bearing rope and the corresponding underlying bottom load-bearing rope is instantaneously different from the distance according to the configuration and, in particular, different from the distance between the corresponding rows of top and bottom jaws. Following upon deflection, coupling of the jaws to the respective load-bearing ropes is possible only by moving the bottom load-bearing ropes away from the top ones, and this requires, in addition to a considerable physical effort, dedicated installation equipment, use of which is rendered relatively difficult by the relatively small extension of the supporting platforms.

The foregoing determines relatively long times and relatively high costs for assemblage of the modules.

SUMMARY

The present disclosure relates to a belt-conveying aerial system.

Specifically, the present disclosure regards a belt-conveying aerial system of the type comprising a pair of top fixed load-bearing ropes, which are coplanar with respect to one another, a pair of bottom fixed load-bearing ropes which are also coplanar with respect to one another and are parallel to the top ropes, and a belt conveyor, which extends between the two pairs of load-bearing ropes.

The advantage of the present disclosure is to provide a belt-conveying aerial system, the constructional characteristics of which enable certain of the problems highlighted above to be solved in a relatively simple and relatively inexpensive way.

According to the present disclosure, a belt-conveying aerial system is provided, comprising a pair of top fixed load-bearing ropes parallel to one another and set at a distance apart from one another in a transverse direction, a pair of bottom fixed load-bearing ropes each set parallel to and underneath a respective top load-bearing rope, and a belt conveyor, connected to said load-bearing ropes: the belt conveyor comprising a conveyor belt, a plurality of modules aligned with respect to one another along said load-bearing, ropes in order to support and guide said conveyor belt; each said module comprising a rigid supporting frame of its own and, for each load-bearing rope, a respective row of attachment members; the system further comprising a vehicle configured to install said modules on said load-bearing ropes; the installation vehicle comprising a top supporting carriage mobile longitudinally in opposite directions on said top load-bearing ropes, and at least one pair of resting or treading platforms, which, are suspended from said top carriage and are set on opposite lateral sides of said load-bearing ropes and of said modules, said system being characterized in that said installation vehicle further comprises, for each bottom load-bearing rope, at least one pair of wheels, which are arranged upstream, and downstream of said module in said longitudinal direction and are rotatable in contact with the respective bottom load-bearing rope; spacers being set between said wheels and said carriage configured to keep the wheels at a given or designated distance from said carriage.

In certain embodiments, in the system defined above, the spacers comprise, for each said wheel, an upright, which is orthogonal to said load-bearing ropes and is stably connected to said carriage, said wheels being hinged to a terminal portion of the corresponding said upright.

Additional features and advantages are described in, and will be apparent from the following Detailed Description and the figures,

BRIEF DESCRIPTION OF THE DRAWINGS

The disclosure will now be described with reference to the annexed drawings, which illustrate a non-limiting example of embodiment thereof, and in which.

DETAILED DESCRIPTION

Figure 1:
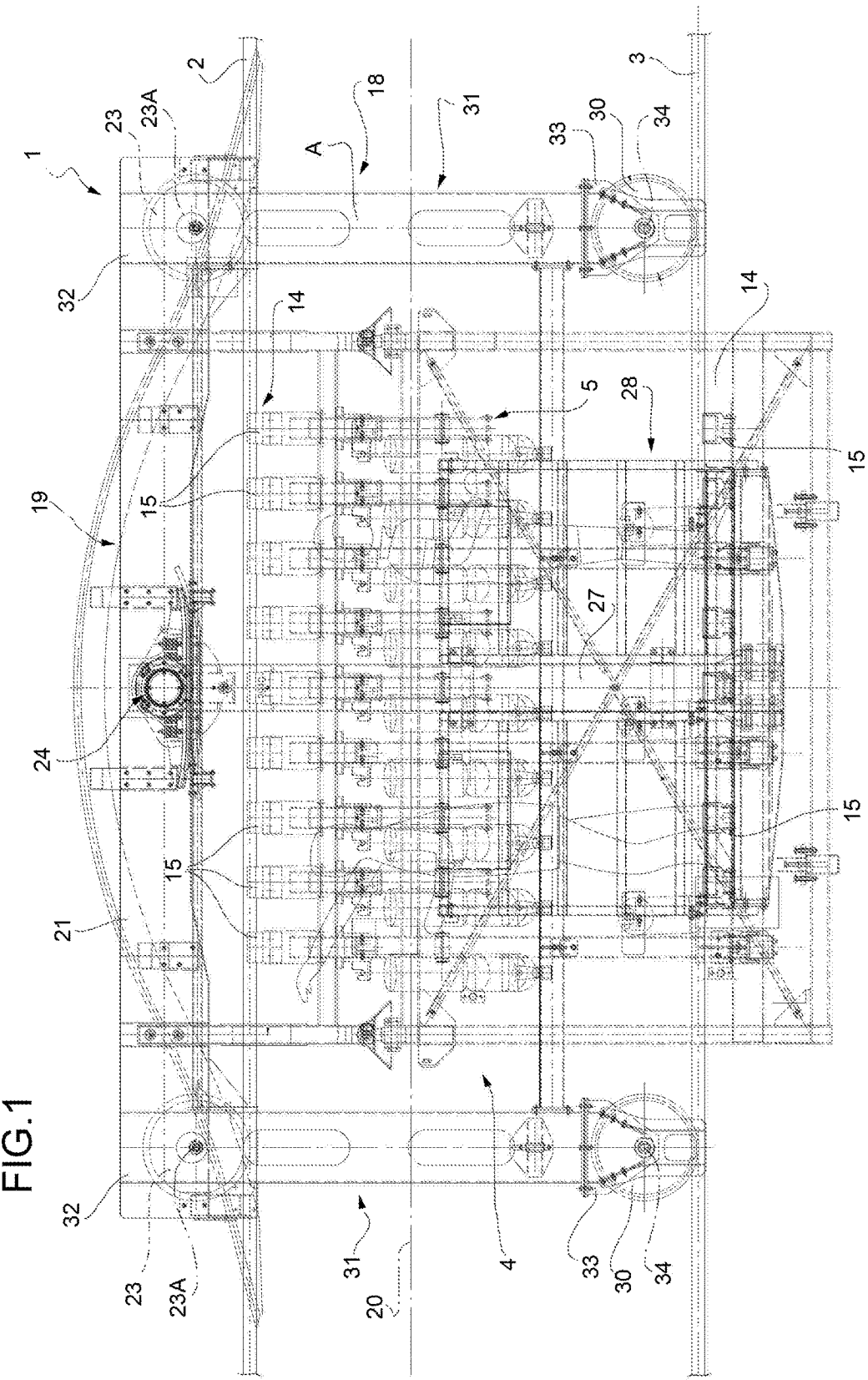
FIG. 1 illustrates, partially and in side elevation, one example embodiment of a belt-conveying aerial system provided according to the teachings of the present disclosure.
Figure 2:
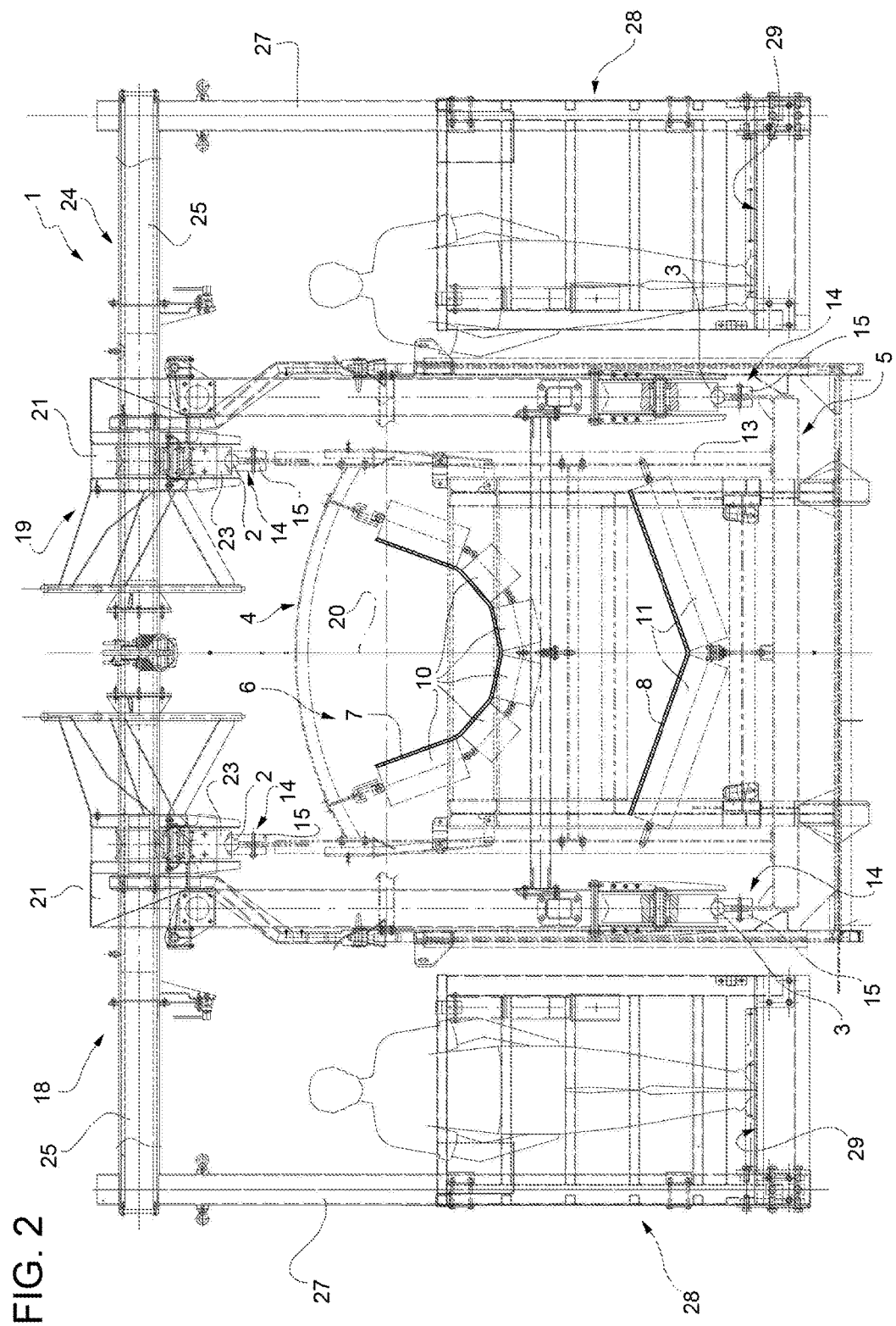
FIG. 2 is a cross section according to the line of FIG. 1.
Figure 3:
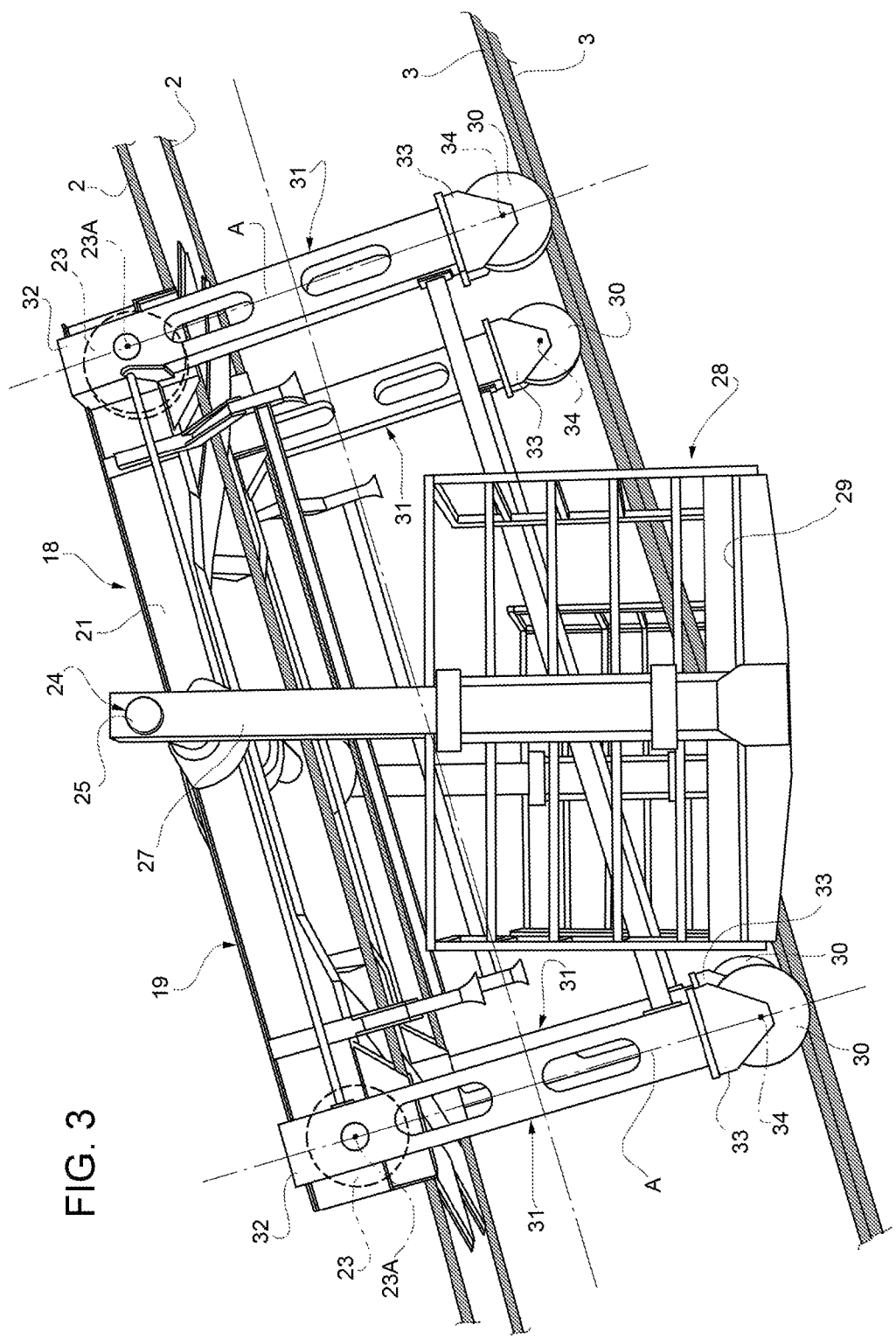
FIG. 3 is a perspective view of a detail of FIGS. 1 and 2.

Referring row to the example embodiments of the present disclosure illustrated in FIGS. 1 to 3, in FIGS. 1 and 2, designated, as a whole, by 1 is a belt-conveying aerial system comprising a pair of top fixed load-bearing ropes 2 stretched between two anchorage points (not visible in the attached figures) in positions parallel to one another and set at a distance apart from one another in a transverse direction.

The system then comprises a pair of bottom fixed load-bearing ropes 3, which are also stretched between two fixed points (not visible in the attached figures) and are each set parallel to and underneath a respective top load-bearing rope 2 and at a distance from one another, conveniently the same as the distance between the top load-bearing ropes 2.

The system 1 further comprises a belt conveyor 4 (not described in detail) which extends between the load-bearing ropes 2, 3. The belt conveyor 4 comprises a plurality of modules 5 (just one of which is visible in the attached drawings). The modules 5 are aligned with respect to one another along the load-bearing ropes 2, 3 in order to support and guide a respective stretch of a conveyor belt 6 (FIG. 2) having a forward branch 7 and a return branch 8, which are mobile on supporting idle rollers 10 and 11 carried by the frames 13 of the aforesaid modules 5.

Each frame 13 is then provided, for each load-bearing rope 2, 3, with a respective row 14 of jaws 15 for attachment to the corresponding load-bearing rope 2, 3 (not described in detail).

Once again with reference to FIGS. 1 and 2 and, in particular to FIG. 3, the system 1 further comprises a vehicle 18 configured to install the modules 5 on the load-bearing ropes 2, 3, The installation vehicle 18 comprises a top supporting carriage 19 set above the top load-bearing ropes 2 and mobile in opposite directions on the top load-bearing ropes 2 themselves in a longitudinal direction 20. The carriage 19 comprises, for each top load-bearing rope 2, a longitudinal member 21 parallel to the load-bearing ropes 2, 3 and a pair of wheels 23, which are set one upstream and the other downstream of the corresponding module 5 and are hinged to opposite terminal portions of the corresponding longitudinal member 21 so as to turn about respective axes 23A orthogonal to the load-bearing ropes 2, 3.

The carriage 19 carries, coupled to the longitudinal members 21, an intermediate portion of a cylindrical beam 24 comprising two opposed terminal portions 25 that project in cantilever fashion beyond the carriage 19. Fixedly connected to the free end of each terminal portion 25 is a top terminal portion of a rigid upright 27, coupled to a bottom terminal portion of which is a shuttle 28 for the staff responsible for installing the modules 5, which has a treading platform 29 that is horizontal irrespective of the inclination of the load-bearing ropes 2, 3 (as may be seen in FIG. 3).

Once again with reference to FIG. 3, the uprights 27 and the corresponding shuttles 28 are set on opposite lateral sides of the load-bearing ropes 2, 3 and of the corresponding module 5 that is being installed.

Once again with reference to the attached figures, the installation vehicle 18 further comprises, for each bottom load-bearing rope 3, a pair of wheels 30, which are set one upstream and the other downstream of the module 5 in the longitudinal direction and are rotatable in contact with the respective bottom load-bearing rope 3. Each wheel 30 is carried by a corresponding upright 31 that keeps the wheel at a fixed distance from the carriage 19 and from an overlying wheel 23 and has a top terminal portion 32 fixedly connected to the corresponding longitudinal member 21 in the proximity of the axis 23A, and a fork-shaped load-bearing bottom terminal portion 33 hinged to the corresponding wheel 30 in a rotatable way about an axis 34 of its own parallel to the axes 23A. As may be seen once again from the attached figures, the axes 23A and 34 are intersected by a common line A orthogonal to the load-bearing ropes 2, 3 and to the axes 23A and 34, From the foregoing, it emerges that the structure of the carriage 19 and, in particular, the fact that carriage comprises two sets of wheels arranged at a given or designated and fixed vertical distance from one another keeps the top load-bearing ropes at a fixed and predefined distance from the bottom load-bearing ropes irrespective of the load applied on the carriage 19, and this enables a relatively easy and relatively fast coupling of the jaws 15 to the respective load-bearing ropes 2, 3, without the need to use dedicated installation equipment.

The scope of the present disclosure is defined by the claims, which cover variants that are not explicitly described and equivalent embodiments. As such, changes may be made to the embodiments of the present disclosure described with reference to the attached drawings without, however, departing from the protective scope of the accompanying Claims. Accordingly, various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A belt-conveying aerial system comprising:
   a pair of top fixed load-bearing ropes set at a distance apart from one another in a transverse direction;
   a pair of bottom fixed load-bearing ropes, wherein a first bottom fixed load-bearing rope of the pair of bottom fixed load-bearing ropes is underneath a first top fixed load-bearing rope of the pair of top fixed load-bearing ropes and a second bottom fixed load-bearing rope of the pair of bottom fixed load-bearing ropes is underneath a second top fixed load-bearing rope of the pair of top fixed load-bearing ropes;
   a belt conveyor connected to said pair of top fixed load-bearing ropes and said pair of bottom fixed load-bearing ropes, said belt conveyor including:
      a conveyor belt,
      a plurality of modules aligned with respect to one another along said load-bearing ropes, said modules configured to support and guide said conveyor belt, wherein each module includes:
         a rigid supporting frame, and
         for each of the load-bearing ropes, a row of attachment members; and
   a vehicle configured to install said modules on said load-bearing ropes, said vehicle including:
      a top supporting carriage longitudinally mobile in opposite directions along said top fixed load-bearing ropes,
      a pair of platforms suspended from said top supporting carriage, wherein a first platform of the pair of platforms is set on a first lateral side of said load-bearing ropes and said plurality of modules, and a second platform of the pair of platforms is set on a second, opposite lateral side of said load-bearing ropes and said plurality of modules, and
      for each bottom fixed load-bearing rope, at least one, pair of wheels wherein:
         a first wheel of the pair of wheels is set upstream, in a longitudinal direction, from said plurality of modules and configured to be in rotatable contact with said bottom fixed load-bearing rope, a second wheel of the pair of wheels is set downstream, in the longitudinal direction, from said plurality of modules and configured to be in rotatable contact with said bottom fixed load-bearing rope, and a plurality of spacers are set between said wheels and said top supporting carriage, said spacers being configured to keep each of said wheels a designated distance from said top supporting carriage.

2. The belt-conveying aerial system of claim 1, wherein:
the spacers include, for each of said wheels, an upright which is orthogonal to said load-bearing ropes and stably connected to said top supporting carriage, and
said wheels are hinged to a terminal portion of the corresponding upright.

3. The belt-conveying aerial system of claim 1, wherein said top supporting carriage includes, for each top fixed load-bearing rope, a longitudinal member parallel to the top fixed load-bearing rope and a pair of wheels which are hinged to said longitudinal member and set upstream and downstream, in the longitudinal direction, from said plurality of modules.

4. The belt-conveying aerial system of claim 3, wherein:
the spacers include, for each of said wheels, an upright which is orthogonal to said load-bearing ropes and stably connected to said top supporting carriage, said uprights being fixedly connected to said longitudinal members,
one of the wheels that rolls in contact with one of the bottom fixed load-bearing ropes is rotatable about a first axis, and
a corresponding overlying one of the wheels that rolls in contact with one of the top load-bearing ropes is rotatable about a second axis, wherein the first axis and the second axis intersect a common line orthogonal to said load-bearing ropes.

5. The belt-conveying aerial system of claim 1, wherein the at least one pair of platforms are selected from the group consisting of: resting platforms and treading platforms.

6. The belt-conveying aerial system of claim 1, wherein the pair of top fixed load-bearing ropes are parallel to one another.

7. The belt-conveying aerial system of claim 6, wherein the pair of bottom fixed load-bearing ropes are parallel to one another.

8. A belt-conveying aerial system installation vehicle comprising:
a top supporting carriage longitudinally mobile in opposite directions along a pair of top fixed load-bearing ropes which are set at a distance apart from one another in a transverse direction, wherein a first bottom fixed load-bearing rope of a pair of bottom fixed load-bearing ropes is underneath a first top fixed load-bearing rope of the pair of top fixed load-bearing ropes and a second bottom fixed load-bearing rope of the pair of bottom fixed load-bearing ropes is underneath a second top fixed load-bearing rope of the pair of top fixed load-bearing ropes;
a pair of platforms suspended from said top supporting carriage, wherein:
a first platform of the pair of platforms is set on a first lateral side of said load-bearing ropes and a plurality of modules of a belt conveyor connected to said pair of top fixed load-bearing ropes and said pair of bottom fixed load-bearing ropes, said belt conveyor including the plurality of modules aligned with respect to one another along said load-bearing ropes, said modules configured to support and guide said conveyor belt, wherein each module includes a rigid supporting frame, and for each of the load-bearing ropes, a row of attachment members, and
a second platform of the pair of platforms is set on a second, opposite lateral side of said load-bearing ropes and said plurality of modules; and for each bottom fixed load-bearing rope, at least one pair of wheels wherein:
a first wheel of the pair of wheels is set upstream, in a longitudinal direction, from said plurality of modules and configured to be in rotatable contact with said bottom fixed load-bearing rope,
a second wheel of the pair of wheels is set downstream, in the longitudinal direction, from said plurality of modules and configured to be in rotatable contact with said bottom fixed load-bearing rope, and
a plurality of spacers are set between said wheels and said top supporting carriage, said spacers being configured to keep each of said wheels a designated distance from said top supporting carriage.

9. The belt-conveying aerial system installation vehicle of claim 8, wherein:
the spacers include, for each of said wheels, an upright which is orthogonal to said load-bearing ropes and stably connected to said top supporting carriage, and
said wheels are hinged to a terminal portion of the corresponding upright.

10. The belt-conveying aerial system installation vehicle of claim 8, wherein said top supporting, carriage includes, for each top fixed load-bearing rope, a longitudinal member parallel to the top fixed load-bearing rope and a pair of wheels which are hinged to said longitudinal member and set upstream and downstream, in the longitudinal direction, from said plurality of modules.

11. The belt-conveying aerial system installation vehicle of claim 10, wherein:
the spacers include, for each of said wheels, an upright which is orthogonal to said load-bearing ropes and stably connected to said top supporting carriage, said uprights being fixedly connected to said longitudinal members,
one of the wheels that rolls in contact with one of the bottom fixed load-bearing ropes is rotatable about a first axis, and
a corresponding overlying one of the wheels that rolls in contact with one of the top load-bearing ropes is rotatable about a second axis, wherein the first axis and the second axis intersect a common line orthogonal to said load-bearing ropes.

12. The belt-conveying aerial system installation vehicle of claim 8, wherein the at least one pair of platforms are selected from the group consisting of: resting platforms and treading platforms.

13. The belt-conveying aerial system installation vehicle of claim 8, wherein the pair of top fixed load-bearing ropes are parallel to one another.

14. The belt-conveying aerial system installation vehicle of claim 13, wherein the pair of bottom fixed load-bearing ropes are parallel to one another.

* * * * *